(12) United States Patent
Sakakibara

(10) Patent No.: US 6,892,111 B2
(45) Date of Patent: May 10, 2005

(54) CONTROL SYSTEM OF MACHINE TOOL

(75) Inventor: Yasuji Sakakibara, Aichi-ken (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 333 days.

(21) Appl. No.: 10/066,589

(22) Filed: Feb. 6, 2002

(65) Prior Publication Data
US 2002/0183889 A1 Dec. 5, 2002

(30) Foreign Application Priority Data
Feb. 9, 2001 (JP) ..................................... 2001-033497

(51) Int. Cl.[7] ............................................. G06F 19/00
(52) U.S. Cl. ..................... 700/180; 700/195; 700/74; 700/108; 706/911
(58) Field of Search ................................ 700/173, 180, 700/175, 174; 409/194; 706/911, 912; 408/11

(56) References Cited

U.S. PATENT DOCUMENTS 5,485,620 A * 1/1996 Sadre et al. ................ 717/162
5,984,503 A * 11/1999 Strickland et al. ............ 700/95
6,138,056 A * 10/2000 Hardesty et al. ............ 700/174

* cited by examiner

Primary Examiner—Kidest Bahta
(74) Attorney, Agent, or Firm—Oblon, Spivak, McClelland, Maier & Neustadt, P.C.

(57) ABSTRACT

Functional blocks (a numerical control unit 22, servo control unit 26, PLC control unit 24, sizing control unit 23, sampling control unit 25, and display control unit 21) carry out their respective functions of control processing. Numerical control data, PLC control data, and sizing data as details of numerical control processing, PLC control processing, and sizing processing, respectively, are sampled and recorded by sampling control processing. The three kinds of recorded data are displayed together on one display unit 80 by display control processing when a display instruction is given by an operator of a control system 10 through an input control unit 90. Thus, an operator of the control system 10 can carry out the work of tracing the cause of the trouble of a machine tool 70 and of examining efficient machining processes of the machine tool 70 by simultaneously watching the control data displayed on one display unit 80. This provides a control system of the machine tool that can improve workability.

6 Claims, 10 Drawing Sheets

CONTROL SYSTEM OF MACHINE TOOL

INCORPORATION BY REFERENCE

The present application claims priority under 35 U.S.C. §119 to Japanese Patent Application No. 2001-33497, filed on Feb. 9, 2001. The contents of that application are incorporated herein by reference in their entirety.

BACKGROUND OF THE INVENTION

1. Field of the Invention

The present invention relates to a control system of a machine tool, and more particularly to a control system of a machine tool provided with a computerized numerical controller and a programmable logic controller.

2. Description of the Related Art

Traditionally, there has been widely used a technology of controlling various kinds of machine tools such as grinding machines by using CNC (Computerized Numerical Controller) and PLC (Programmable Logic Controller).

In addition, there has been also widely used a technology of controlling the machine tool in which a sizing device is provided for measuring a size of a workpiece (for example, in the case of an external cylindrical grinding machine, a diameter of a workpiece) under machining by the machine tool so as to make the computerized numerical controller carry out the control on the basis of the measured result of the sizing device.

Such a computerized numerical controller is provided with a display unit on which only information about the various control axes of the machine tool is to be displayed. Moreover, the programmable logic controller is also to be provided with a display unit on which only information about inputting and outputting is to be displayed. Furthermore, the sizing unit is also to be provided with a display unit on which only the measured result is to be displayed.

As described above, each of the computerized numerical controller, the programmable logic controller and the sizing unit in the related art is provided with the display unit on which only information about itself is to be displayed. This necessitates an operator of the control system of the machine tool to carry out the control operation by visually comparing the respective display units of the computerized numerical controller, the programmable logic controller and the sizing unit.

Therefore, when trouble of some kind such as a failure of the machine tool or machining failure of the workpiece occurs, the operator must carry out the work of tracing the cause of the trouble by visually comparing a plurality of display units. Furthermore, also in examining efficient machining processes of the machine tool, the operator must carry out the examination work by visually comparing a plurality of display units.

Thus, the work carried out by the operator visually comparing the respective display units of the computerized numerical controller, the programmable logic controller and the sizing unit caused a problem of worsening workability.

The present invention was made to solve the above problem with an object of providing a control system of a machine tool capable of improving workability.

SUMMARY OF THE INVENTION

The gist of the first aspect of the invention made for achieving the above object is a control system of a machine tool including a machine tool having a plurality of control axes for carrying out machining of a workpiece, a computerized numerical controller carrying out numerical control of each of a plurality of the control axes of the machine tool according to an operation program, a programmable logic controller carrying out control of the machine tool according to the operation program, a measuring unit measuring states of the workpiece under machining by the machine tool, and a display unit displaying at least one selected from details of control by the computerized numerical controller, details of control by the programmable logic controller, and details of measurement by the measuring unit.

Therefore, according to the first aspect of the invention, when trouble of some kind such as a failure of the machine tool or machining failure of the workpiece occurs, it is made possible for an operator of the control system to carry out the work of tracing the cause of the trouble by simultaneously watching the above details displayed together on one display unit. Furthermore, also in examining efficient machining processes of the machine tool, it becomes possible for the operator to carry out the examination work by simultaneously watching the above details displayed together on one display unit. As a result, the workability of the operator of the control system can be made improved.

Incidentally, as the second aspect of the invention, the control system of a machine tool according to the first aspect of the invention can be made to further include a sampling and displaying unit for simultaneously sampling the details from each of the computerized numerical controller, the programmable logic controller, and the measuring unit at a fixed rate, and making the display unit display the sampled details.

Moreover, as the third aspect of the invention, the control system of a machine tool according to the first aspect of the invention can be made to further include a sampling and displaying unit for simultaneously sampling the details from each of the computerized numerical controller, the programmable logic controller, and the measuring unit with a timing based on the operation program of the computerized numerical controller, and making the display unit display the sampled details.

Furthermore, as the fourth aspect of the invention, the control system of a machine tool according to the first aspect of the invention can be made to further include a sampling and displaying unit for simultaneously sampling the details from each of the computerized numerical controller, the programmable logic controller, and the measuring unit with a timing based on a state of operation of the machine tool, and making the display unit display the sampled details.

Next, the gist of the fifth aspect of the invention is that, in the control system of a machine tool according to the fourth aspect of the invention, the programmable logic controller has a detecting means for detecting the state of operation of the machine tool and makes a judgment about the state of operation of the machine tool on the basis of the result of the detection of the detecting means, and the sampling and displaying unit makes setting of the timing for sampling the details from each of the computerized numerical controller, the programmable logic controller, and the measuring unit on the basis of the state of operation of the machine tool judged by the programmable logic controller.

Therefore, according to the fifth aspect of the invention, by changing setting of the condition for judging the state of operation of the machine tool in the programmable logic controller, the timing for sampling the details from each of the computerized numerical controller, the programmable logic controller, and the measuring unit can be changed arbitrarily. The change in the setting of the condition for judging the state of operation of the machine tool in the programmable logic controller can be simply and easily carried out by the operator of the control system. Hence, with the timing set by the operator of the control system arbitrarily, the details can be made sampled from each of the computerized numerical controller, the programmable logic controller, and the measuring unit. This makes it possible to enhance more the working-effect of the first aspect of the invention.

Then, the gist of the sixth aspect of the invention is, in the control system of a machine tool according to any one of the first to the fifth aspects of the invention, to further include an input unit for selecting and indicating the details to be displayed on the display unit.

Therefore, according to the sixth aspect of the invention, it becomes possible for the operator of the control system to select and indicate the details by using the input unit and to make the selected and indicated details displayed on the display unit. This allows the operator to work with improved workability.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

In the following, preferred embodiments of the invention will be explained in detail with reference to the drawings.

Incidentally, correspondence of the components described in the above summary of the invention and in the later presented claims with those described in the preferred embodiments will be explained as follows.

Figure 1:
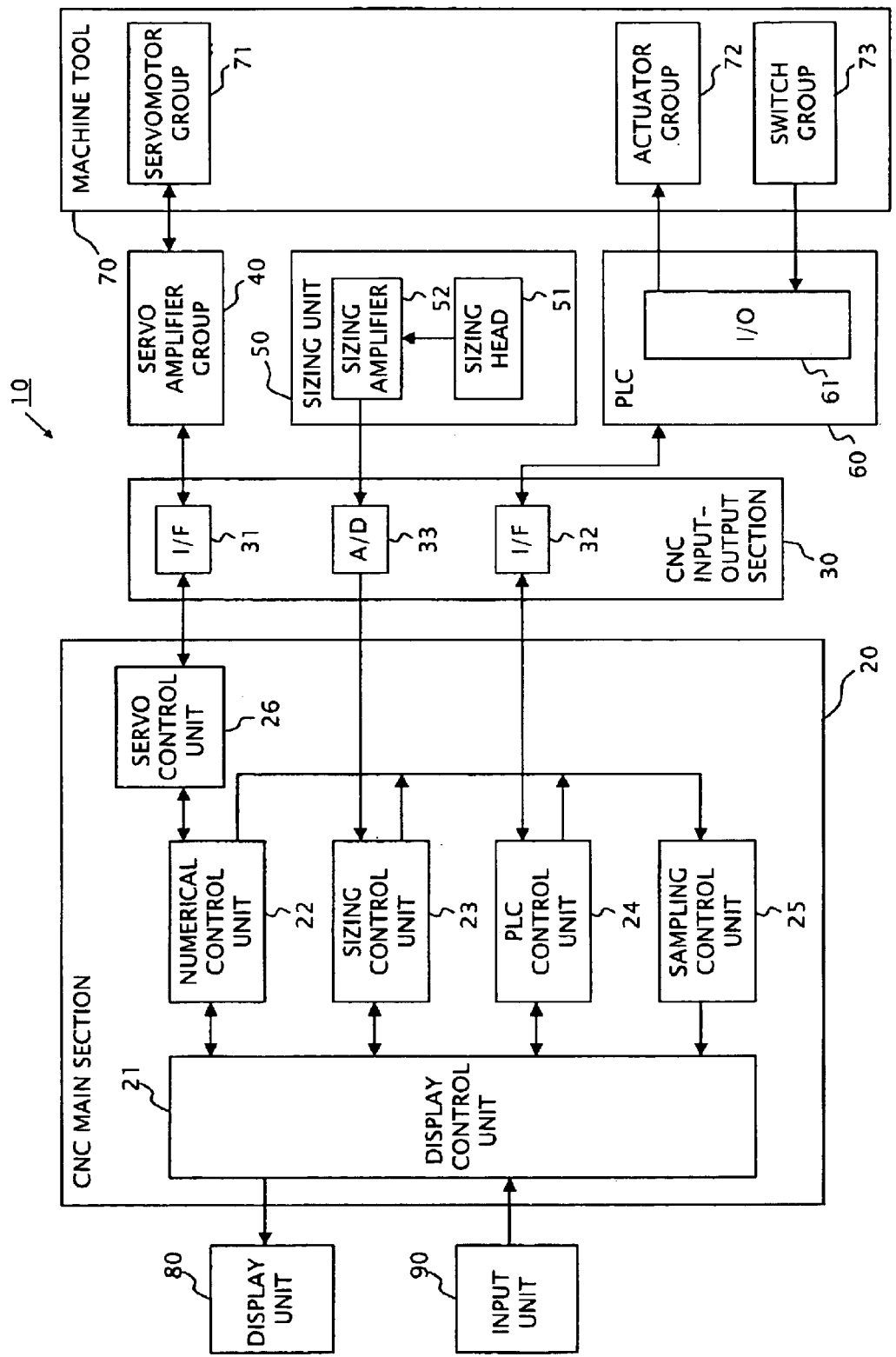
FIG. 1 is a block diagram schematically showing a principal configuration of a control system of a machine tool in an embodiment of the invention.

The "control axes" corresponds to servomotors included in a servomotor group 71 shown in FIG. 1.

The "measuring unit" corresponds to a sizing unit 50 shown in FIG. 1.

Figure 2:
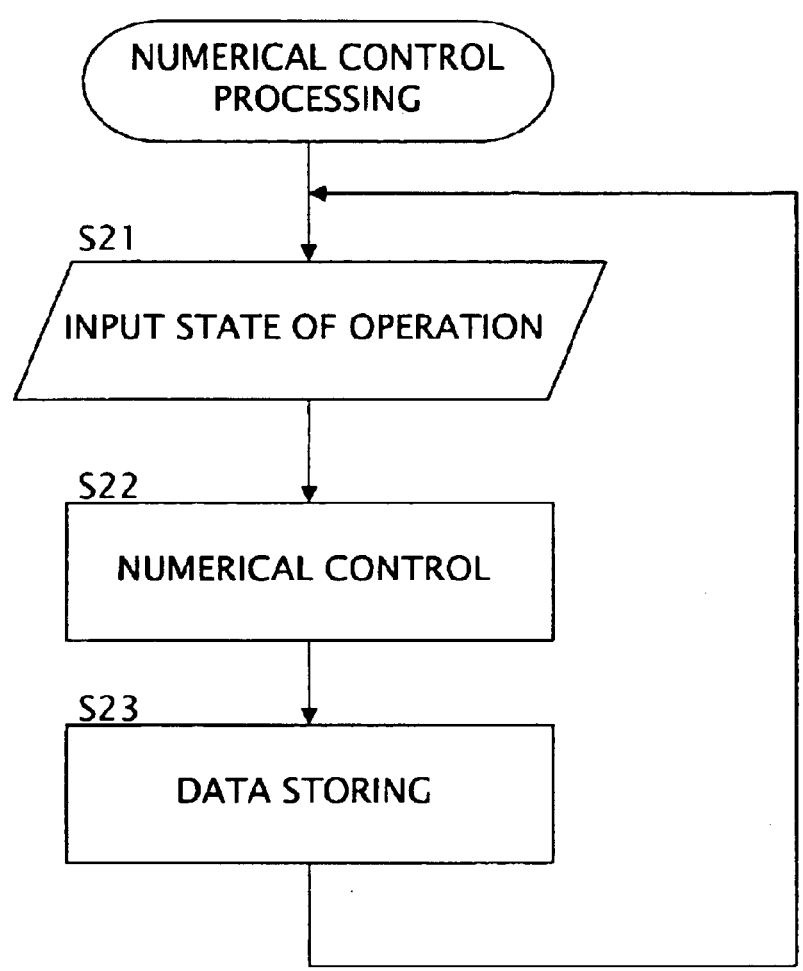
FIG. 2 is a flowchart showing a flow of numerical control processing carried out by a computerized numerical control unit in the embodiment.

The "details of control by the computerized numerical controller" corresponds to data signal of numerical control processing (numerical control data) recorded (stored) in processing at S23 shown in FIG. 2.

Figure 4:
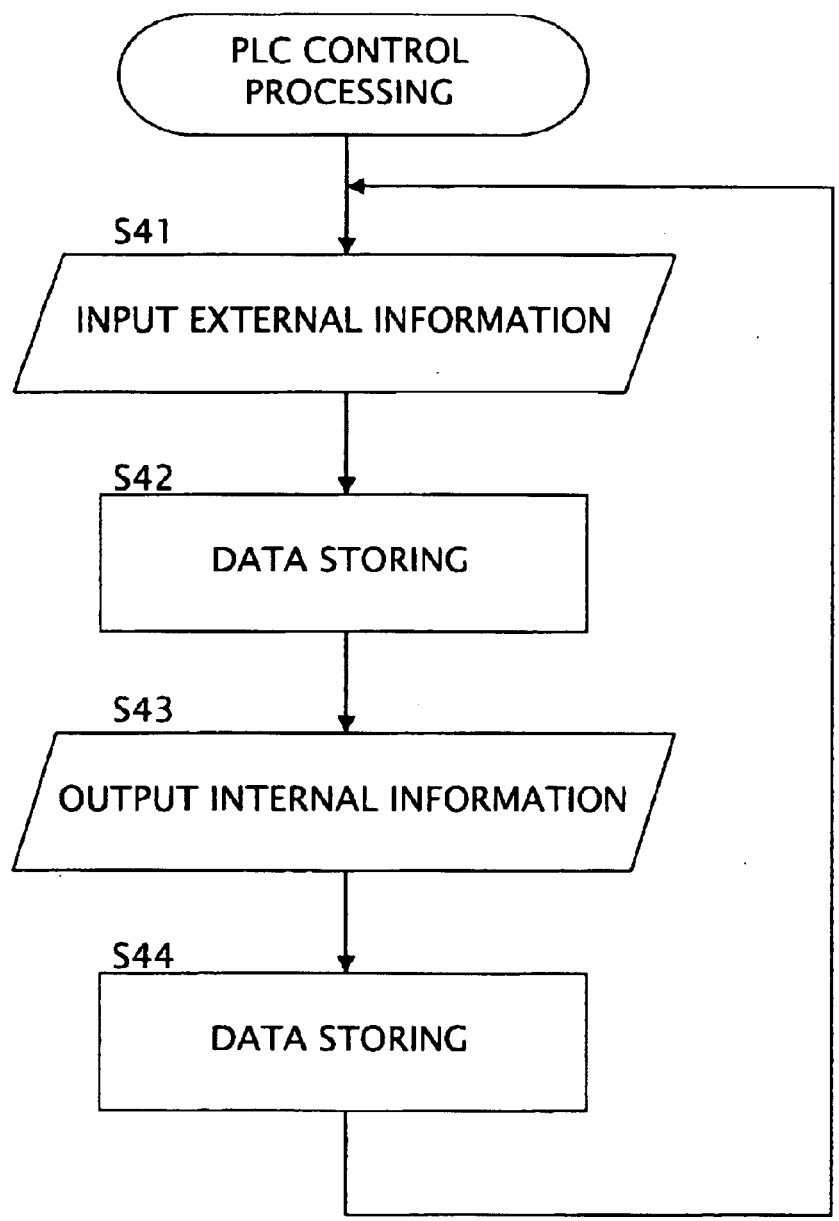
FIG. 4 is a flowchart showing a flow of PLC control processing carried out by a PLC control unit in the embodiment.

The "details of control by the programmable logic controller" corresponds to data signal of PLC control processing (PLC control data) recorded (stored) in processing at S42 and S44 shown in FIG. 4.

Figure 5:
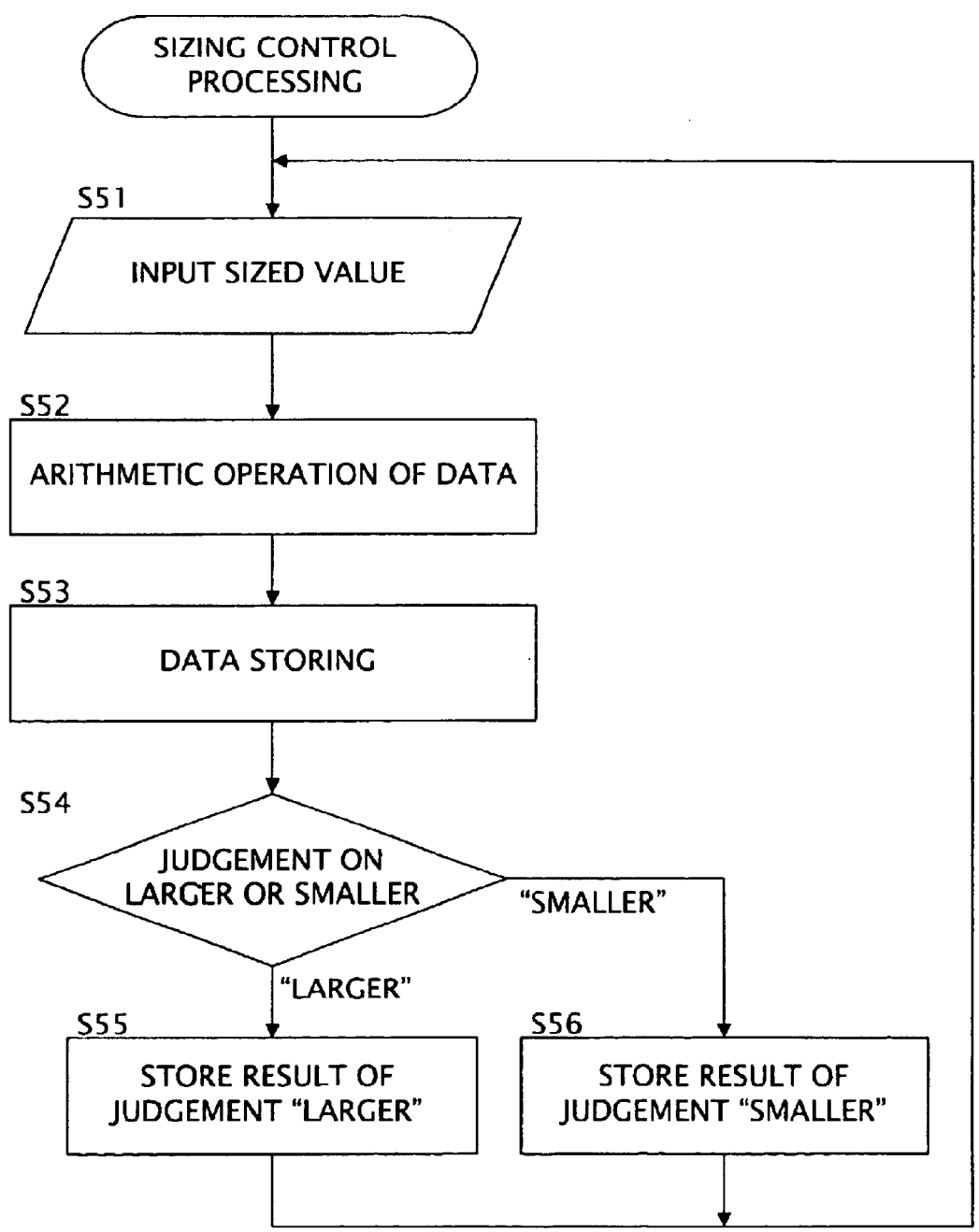
FIG. 5 is a flowchart showing a flow of sizing control processing carried out by a sizing control unit in the embodiment.

The "details of measurement by the measuring unit" corresponds to results of judgment in sizing control processing (sizing control data) recorded (stored) in processing at S55 and S56 shown in FIG. 5.

The "sampling and displaying means" in claims, and the "sampling and displaying unit" in the above summary of the invention correspond to a sampling control unit 25 and a display control unit 21 in a CNC main section 20 shown in FIG. 1 with sampling control processing (S61 to S65 in FIG. 6) and display control processing (S71 to S73 in FIG. 7), respectively.

[Principal Configuration of the Embodiment]

FIG. 1 is a block diagram schematically showing a principal configuration of a control system of a machine tool in the embodiment.

A control system 10 in the embodiment is formed of a main section 20 of a computerized numerical controller (CNC), a CNC input-output section 30, a servo amplifier group 40, a sizing unit 50, a programmable logic controller (PLC) 60, a machine tool 70, a display unit 80, and an input unit 90.

The CNC main section 20 is formed by including a well-known microcomputer having a CPU, a RAM and a ROM (not shown). On starting the CPU, the CNC main section 20 makes a computer system function so as to load computer programs recorded in the ROM into the CPU and, according to the loaded computer programs, to carry out various kinds of arithmetic operation processing by the computer to thereby realize functions of various functional blocks of a display control unit 21, a numerical control (NC) unit 22, a sizing control unit 23, a PLC control unit 24, a sampling control unit 25, and a servo control unit 26.

The CNC main section 20 then controls the display unit 80 on the basis of various data signals inputted from the CNC input-output section 30 by following an instruction of an operator inputted from the input unit 90. Along with this, the CNC main section 20 produces a data signal for controlling the sizing unit 50, the PLC 60, and the machine tool 70, and transfers the data signal to the CNC input-output section 30.

The CNC input-output section 30 is formed of a servo interface (I/F) 31, a PLC interface 32, and a sizing unit A/D converter 33. Through the CNC input-output section 30, data signals are exchanged between the CNC main section 20 and the sizing unit 50, the PLC 60, and the machine tool 70.

The machine tool 70 is provided with the servomotor group 71 including a plurality of servomotors as control axes, an actuator group 72 including a plurality of actuators for operating a plurality of processing machines (not shown), and a switch group 73 including a plurality of switches for detecting states of operation of the machine tool 70 of the processing machines and the servomotor group 71, and carries out processing of the workpiece (not shown).

Each of servo amplifiers forming the servo amplifier group 40 amplifies a data signal transferred thereto from the servo control unit 26 in the CNC main section 20 through the servo interface 31 in the CNC input-output section 30 and transfers the amplified data signal to the corresponding servomotor forming the servomotor group 71 to drive and control the servomotor. Moreover, each servo amplifier detects a state of operation of the corresponding servomotor and transfers a data signal of the result of the detection to the servo control unit 26 through the servo interface 31.

The sizing unit 50 includes a sizing head 51 measuring a dimension (for example, a diameter of a workpiece when the machine tool 70 is an external cylindrical grinding machine. Furthermore, a thickness or a width of a workpiece when the machine tool 70 is a surface grinding machine.) of a workpiece under machining by the machine tool 70, and a sizing amplifier 52 amplifying a detection signal outputted from the sizing head 51.

The detection signal of an analog signal outputted from the sizing amplifier 52 is subjected to A/D conversion to a digital signal by the sizing unit A/D converter 33 in the CNC input-output section 30. The digitized detection signal is transferred to the sizing control unit 23 in the CNC main section 20.

The PLC 60 is formed by including a well-known microcomputer having a CPU, a RAM, a ROM (not shown) and an input-output (I/O) register 61.

The PLC 60 produces driving signals each for controlling each of actuators forming the actuator group 72 of the machine tool 70. The driving signals are produced on the basis of data signals transferred from the PLC control unit 24 in the CNC main section 20 through the PLC interface 32 in the CNC input-output section 30. The PLC 60 further transfers each of the produced driving signals to each of the actuators in the actuator group 72 for driving and controlling each of the actuators.

The PLC 60 also has detection signals inputted each given from each of the switches forming the switch group 73 of the machine tool 70 through the input-output register 61. On the basis of the detection signals, the PLC 60 judges the state of operation of the machine tool 70 to transfer data signals of the result of judgment to the PLC control unit 24 through the PLC interface 32.

Furthermore, the PLC 60 produces a sampling instruction signal when the state of operation of the machine tool 70 becomes a specified state or at a fixed rate to transfer the sampling instruction signal to the PLC control unit 24 through the PLC interface 32.

The display unit 80 is formed of, for example, a display, a lamp indicator, and a voice reproduction unit. The display unit 80, by displaying later described details of display control processing in the display control unit 21 of the CNC main part 20, informs the operator of the control system 10 of the details of the result of the processing.

The input unit 90 is formed of, for example, a keyboard, a pointing device, and a voice input unit. The input unit 90, on having a display instruction inputted by the operator of the control system 10 for displaying the details of the display control processing on the display unit 80, outputs the display instruction of the details to the display control unit 21 in the CNC main section 20.

[Operation of the Embodiment]

FIG. 2 to FIG. 9 are flowcharts each showing a flow of processing carried out by each of the functional blocks (the numerical control unit 22, the servo control unit 26, the PLC control unit 24, the sizing control unit 23, the sampling control unit 25, and the display control unit 21) in the CNC main section 20.

The CPU (not shown) forming the CNC main section 20 carries out processing in each of the following steps by various kinds of processing by the computer according to the computer programs recorded in the ROM (not shown) contained in the CNC main section 20.

The computer programs may be recorded in an external recording unit (external storage) provided with a computer readable recording medium so as to be loaded therefrom into the CPU in the CNC main section 20 and activated as necessary for being used. The computer readable recording medium is named as a semiconductor memory (such as a memory stick), a hard disk, a floppy disk, a data card (such as an IC card or a magnetic card), an optical disk (such as a CD-ROM, a CD-R, a CD-RW, or a DVD), a magneto optical disk (such as an MO), a phase change optical disk, or a magnetic tape.

[Numerical Control Processing]

FIG. 2 is a flowchart showing a flow of numerical control processing carried out by the numerical control unit 22.

At first, the numerical control unit 22 has data signals inputted which are transferred from servo amplifiers forming the servo amplifier group 40 through the servo interface 31 in the CNC input-output section 30 (step (hereinafter described as "S") 21). Each of the data signals is a result of detection of the state of operation of each of the servomotors forming the servomotor group 71 of the machine tool 70.

Next, the numerical control unit 22 newly produces data signals each for controlling and driving each of the servomotors forming the servomotor group 71 by numerical control based on the data signals inputted in the processing at S21 and carries out the numerical control (S22).

Then, the numerical control unit 22 records (stores) the data signals newly produced in the processing at S22 (S23). Subsequent to this, the numerical control unit 22 makes the flow return to the processing at S21 to repeatedly carry out the processing from S21 to S23.

[Servo Control Processing]

Figure 3:
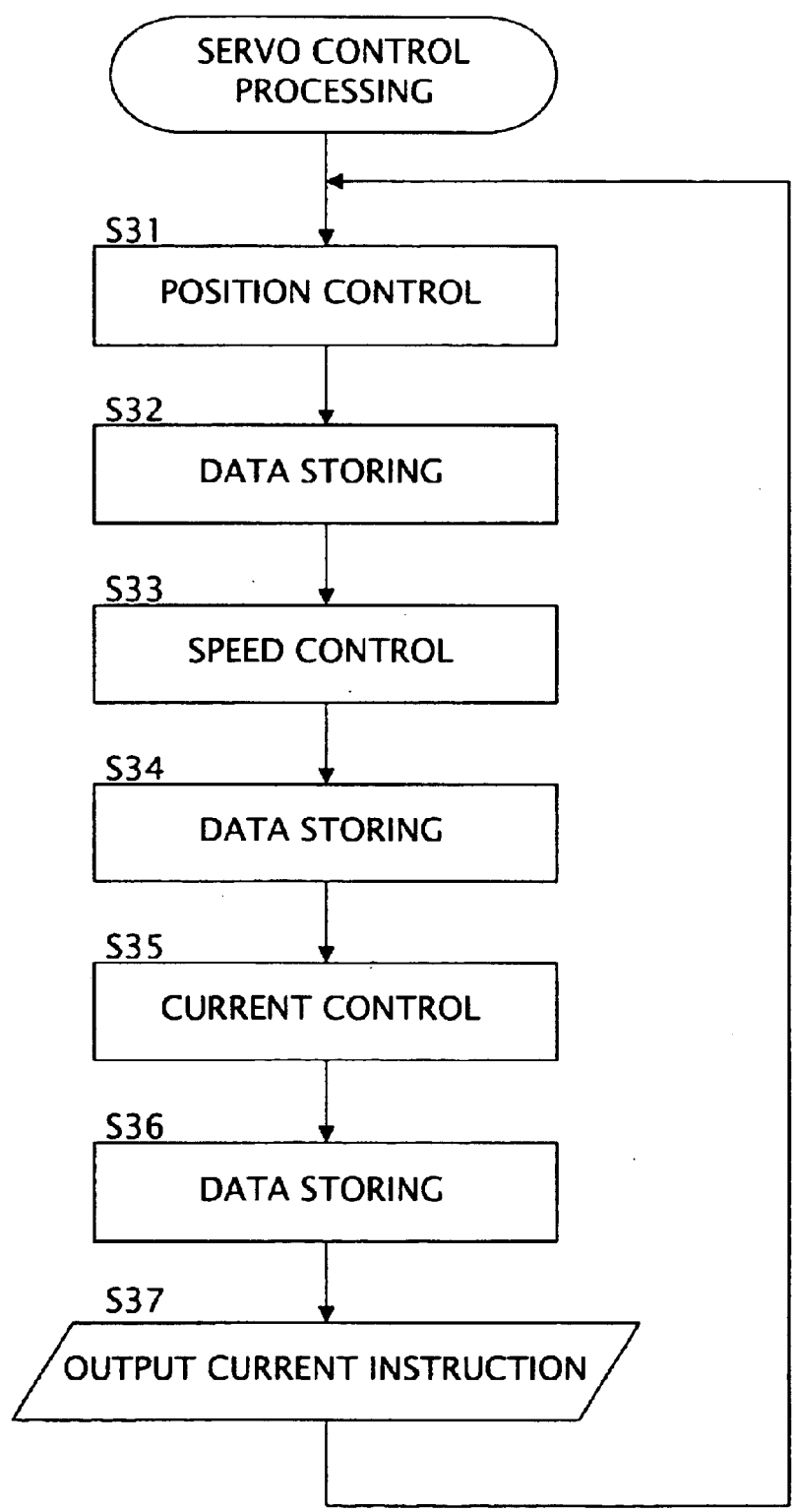
FIG. 3 is a flowchart showing a flow of servo control processing carried out by a servo control unit in the embodiment.

FIG. 3 is a flowchart showing a flow of servo control processing carried out by the servo control unit 26.

At first, on the basis of the data signals stored by the numerical control unit 22 in the processing at S23, the servo control unit 26 produces data signals, each for carrying out position control of each of the servomotors forming the servomotor group 71, to carry out the position control (S31), and records (stores) the produced data signals (S32).

Next, the servo control unit 26 newly produces data signals for carrying out speed control of each of the servomotors on the basis of the data signals stored in the processing at S32 to carry out the speed control (S33), and records (stores) the newly produced data signals (S34).

Subsequent to this, the servo control unit 26 further produces data signals for carrying out current control of each of the servomotors on the basis of the data signals stored in the processing at S34 to carry out the current control (S35), and records (stores) the further produced data signals (S36).

Then, the servo control unit 26 outputs each of the data signals stored in the processing at S36 (the data signals each for carrying out current control of each servomotor) to each of the servo amplifiers forming the servo amplifier group 40 through the servo interface 31 in the CNC input-output section 30 (current instruction output: S37). Subsequent to this, the servo control unit 26 makes the flow return to the processing at S31 to repeatedly carry out the processing from S31 to S37.

[PLC Control Processing]

FIG. 4 is a flowchart showing a flow of PLC control processing carried out by the PLC control unit 24.

At first, the PLC control unit 24 has data signals inputted which are transferred from the PLC 60 through the PLC interface 32 in the CNC input-output section 30 (S41), and records (stores) the inputted data signals (S42). The inputted data signals are items of external information each being a result of judgment on the state of operation of the machine tool 70 made by the PLC 60 on the basis of a detection signal of each of switches forming the switch group 73.

Next, the PLC control unit 24 outputs data signals (items of internal information) produced in the CNC main section 20 to the PLC 60 through the PLC interface 32 in the CNC input-output section 30 (S43), records (stores) the outputted data signals (S44), and makes the flow return to the processing at S41 to thereafter repeatedly carry out the processing from S41 to S44.

[Sizing Control Processing]

FIG. 5 is a flowchart showing a flow of sizing control processing carried out by the sizing control unit 23.

At first, the sizing control unit 23 has a detection signal inputted which is transferred from the sizing unit 50 through the A/D converter 33 in the CNC input-output section 30 (S51), obtains the size of the workpiece by carrying out arithmetic operation on the basis of the detection signal (S52), and records (stores) the obtained value of the size (S53). The detection signal is a sized value as the digital signal of the size of the workpiece measured by the sizing head 51.

Next, the sizing control unit 23 makes a judgment about whether the recorded value of the size is larger or smaller than a predetermined threshold value (S54), records (stores) the result of the judgment (S55 and S56), and subsequent to this, makes the flow return to the processing at S51 to thereafter repeatedly carry out the processing from S51 to S56.

[Sampling Control Processing]

Figure 6:
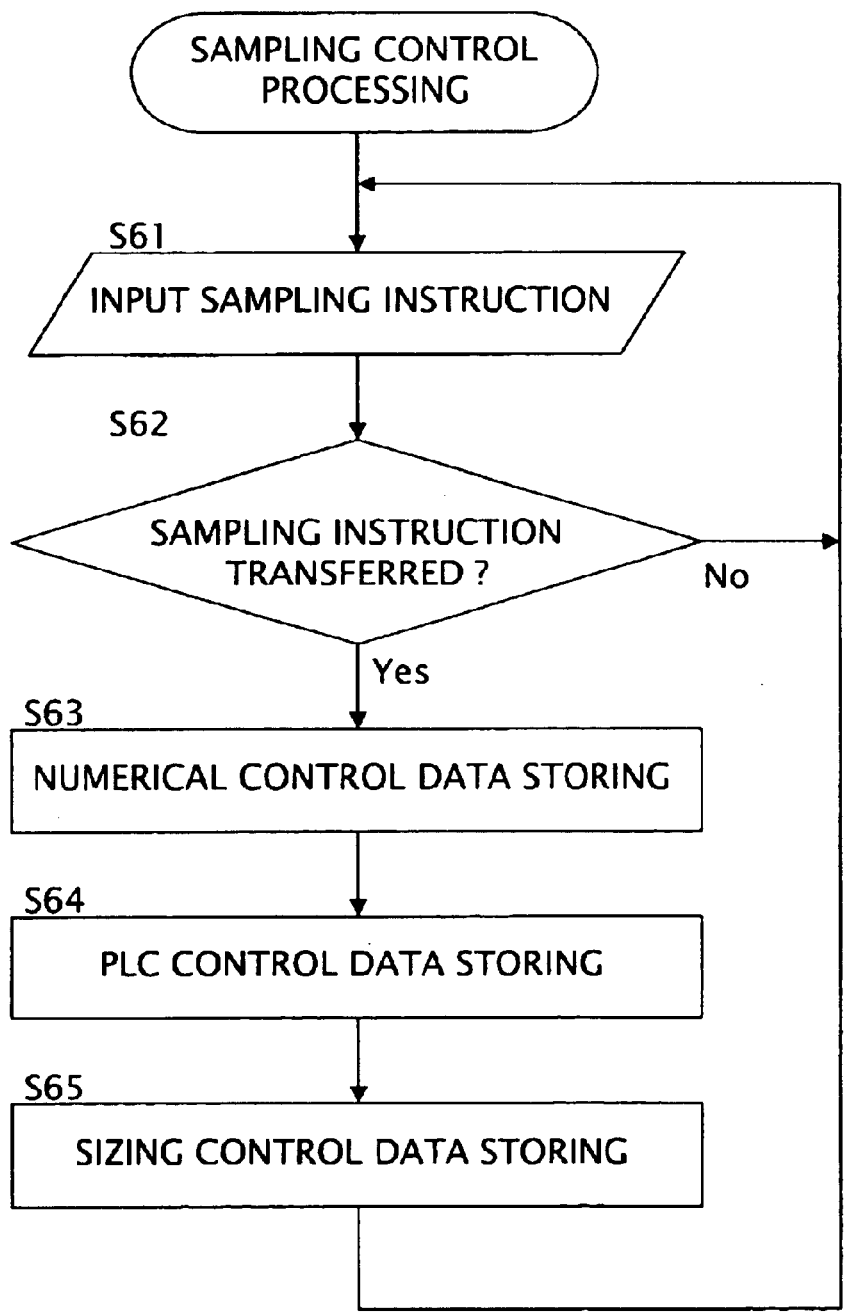
FIG. 6 is a flowchart showing a flow of sampling control processing carried out by a sampling control unit in the embodiment.

FIG. 6 is a flowchart showing a flow of sampling control processing carried out by the sampling control unit 25.

At first, the sampling control unit 25 has a sampling instruction signal inputted which is transferred from the PLC 60 through the PLC interface 32 in the CNC input-output section 30 (S61).

Then, in response to the transferred sampling instruction signal (S62:Yes), the sampling control unit 25 records (stores) the data signals of the numerical control processing (numerical control data) stored in the processing at S23 shown in FIG. 2 (S63), records (stores) the data signals of the PLC control processing (PLC control data) stored in the processing at S42 and S44 shown in FIG. 4 (S64), and records (stores) the result of judgment in the sizing control processing (sizing control data) stored in the processing at S55 and S56 shown in FIG. 5 (S65). Subsequent to this, the sampling control unit 25 makes the flow return to the processing at S61 to thereafter repeatedly carry out the processing from S61 to S65.

[Display Control Processing]

Figure 7:
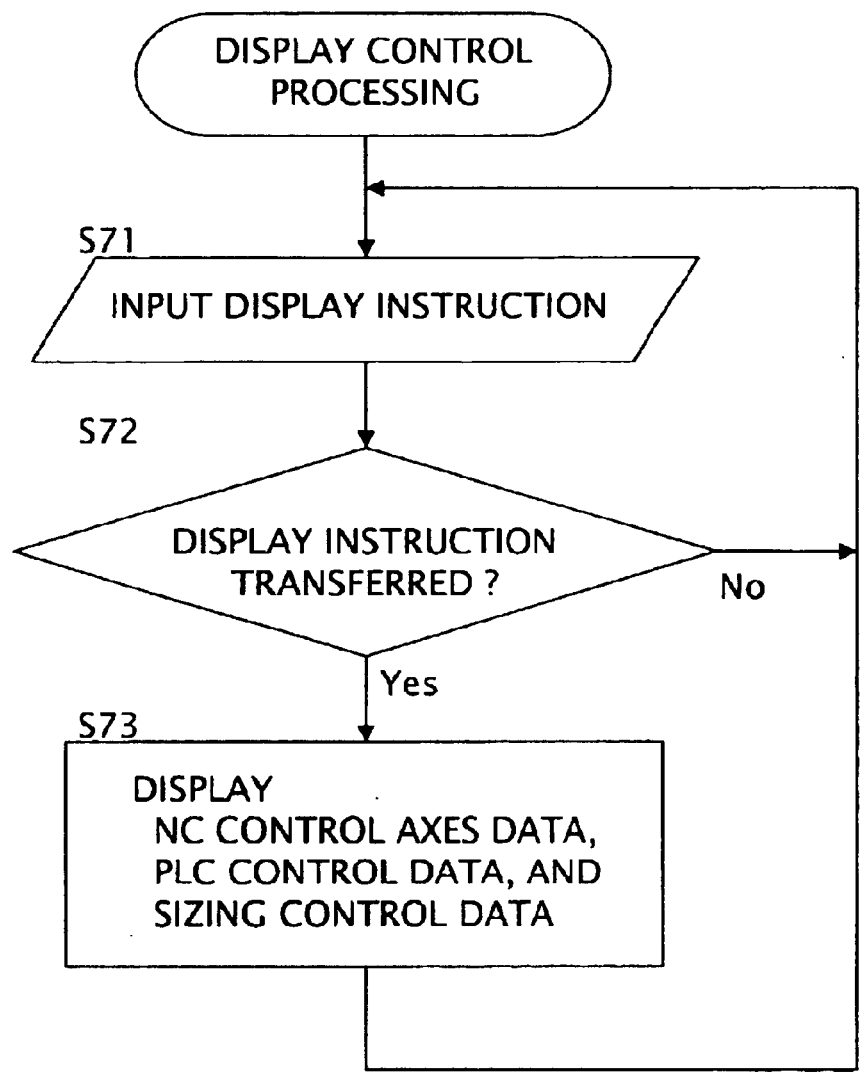
FIG. 7 is a flowchart showing a flow of display control processing carried out by a display control unit in the embodiment.

FIG. 7 is a flowchart showing a flow of display control processing carried out by the display control unit 21.

At first, the display control unit 21 has a display instruction inputted which is an instruction for making the display unit 80 display the data signals of the above various kinds of control processing given from an operator of the control system 10 and transferred from the input unit 90 (S71).

Then, in response to the transferred display instruction (S72:Yes), the display control unit 21, according to the details of the instruction, makes the display unit 80 display together the various control data (the numerical control data, the PLC control data, and the sizing control data) stored in the processing at S63, S64, and S65 shown in FIG. 6 (S73). Subsequent to this, the display control unit 21 makes the flow return to the processing at S71 to thereafter repeatedly carry out the processing from S71 to S73.

[Working-effect of the Embodiment]

As explained above in detail, according to the embodiment, the following working-effect can be obtained.

(1) In the embodiment, the numerical control data, the PLC control data, and the sizing control data as the details of the numerical control processing, the PLC control processing, and the sizing control processing, respectively, are simultaneously sampled to be stored by the sampling control processing. The three kinds of control data, when a display instruction is given by an operator of the control system 10 through the input unit 90, are made displayed together on one display unit 80 by the display control processing.

Therefore, when trouble of some kind such as a failure of the machine tool 70 or machining failure of the workpiece occurs, it is made possible for an operator of the control system 10 to carry out the work of tracing the cause of the trouble by simultaneously watching the three kinds of the control data displayed together on one display unit 80. Furthermore, also in examining efficient machining processes of the machine tool 70, it is made possible for the operator to carry out the examination work by simultaneously watching the three kinds of the control data displayed together on one display unit 80.

As a result, according to the embodiment, the workability of the operator of the control system 10 can be made improved.

(2) In the embodiment, at the time when the sampling instruction signal produced by the PLC 60 has been transferred to the CNC main section 20, the above three kinds of control data are being simultaneously sampled in the sampling control processing. The setting of the timing with which the PLC 60 produces the sampling instruction signal is made at the time when the state of operation of the machine tool 70 becomes a specified state, or at a fixed rate.

Therefore, by changing setting of the condition for producing the sampling instruction signal in the PLC 60, the timing for sampling each of the above three kinds of the control data in the sampling control processing can be changed arbitrarily. The change in making the setting of the condition for producing the sampling instruction signal in the PLC 60 can be simply and easily carried out by the operator of the control system 10.

Hence, according to the embodiment, with an arbitrary timing set by the operator of the control system 10, the above three kinds of control data can be made sampled in the sampling control processing, which can enhance more the workability.

[Other Embodiments]

The invention is not limited to the above embodiments but can be embodied as follows, in which there can be obtained working-effects equivalent to or more than that of the above embodiment.

[1] In the above embodiment, in the processing at S73 shown in FIG. 7, three kinds of control data (the numerical control data, the PLC control data and the sizing control data) are made displayed together on the display unit 80. However, the control data made displayed on the display unit 80 may be one or two kinds of those indicated for being selected from the three kinds of the control data by the operator using the input unit 90.

[2] In the above embodiment, the sampling instruction signal is produced by the PLC 60. The instruction signal, however, may be produced by the numerical control unit 22 rather than the PLC 60. In this case, the setting of the timing with which the numerical control unit 22 produces the sampling instruction signal can be made, for example, at the time when the state of operation of the machine tool 70 becomes a specified state, at a fixed rate, or at a timing set beforehand in the control program of the machine tool 70 stored in the ROM in the CNC main section 20.

[3] In the above embodiment, the sizing unit 50 is used which measures a size of a workpiece under machining by the machine tool 70. The sizing unit 50, however, may be replaced by any measuring unit measuring various states (for example, temperature, pressure, and vibration) of the workpiece under machining by the machine tool 70.

Figure 8:
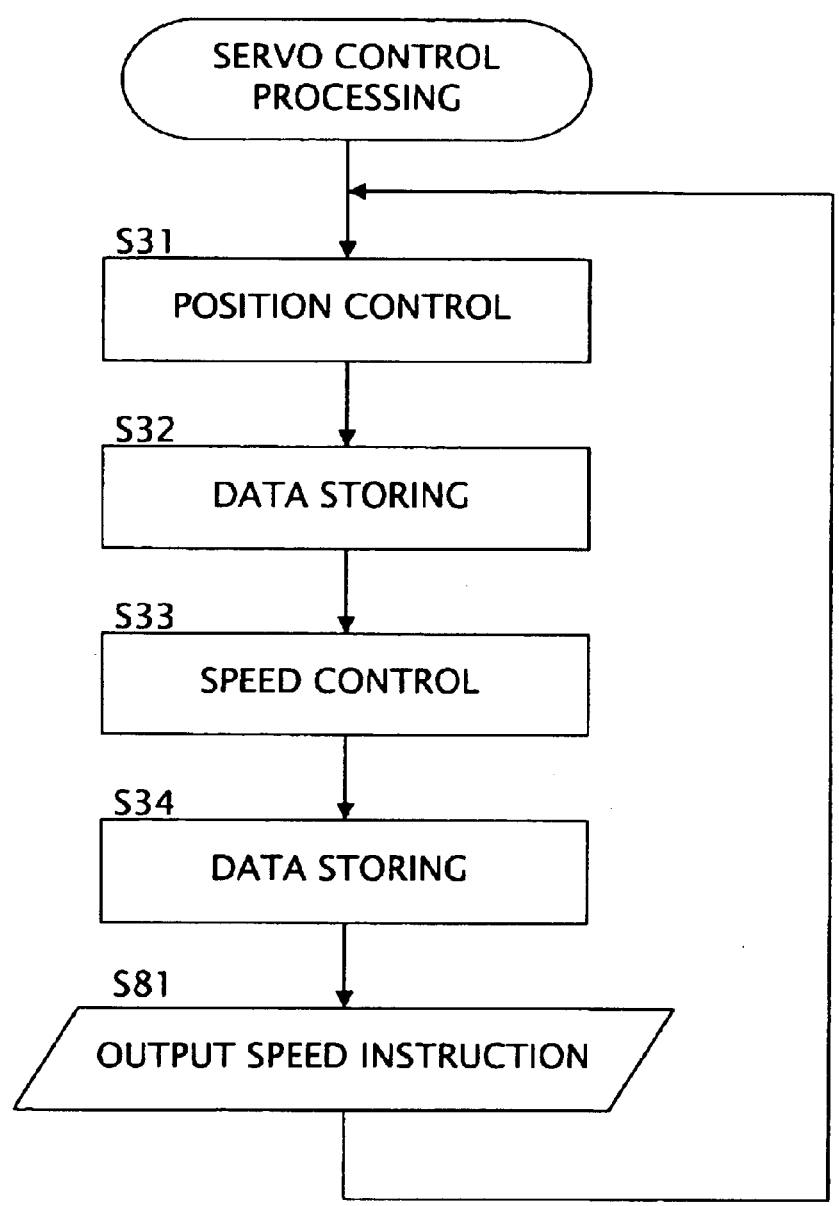
FIG. 8 is a flowchart showing a flow in another embodiment of servo control processing.
Figure 9:
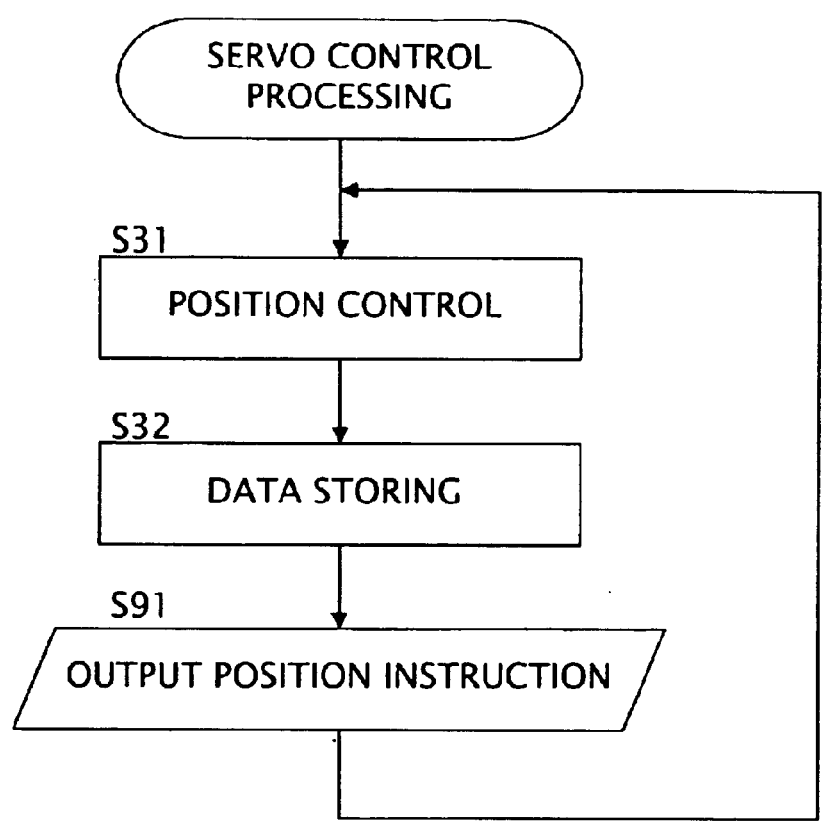
FIG. 9 is a flowchart showing a flow in further another embodiment of servo control processing.

[4] The servo control processing in the above embodiment (see FIG. 3) may be substituted by processing shown in FIG. 8 or FIG. 9.

In the servo control processing shown in FIG. 8, the difference from the processing shown in FIG. 3 is that, subsequent to the processing at S34, each of the data signals stored in the processing at S34 (data signal for carrying out speed control of each servomotor) is outputted to each of the servo amplifiers forming the servo amplifier group 40 (speed instruction output:S81) with the flow subsequently made return to the processing at S31 to thereafter repeatedly carry out the processing from S31 to S34, and S81.

In the servo control processing shown in FIG. 9, the difference from the processing shown in FIG. 3 is that, subsequent to the processing at S32, each of the data signals stored in the processing at S32 (data signal for carrying out position control of each servomotor) is outputted to each of the servo amplifiers forming the servo amplifier group 40 (position instruction output:S91) with the flow subsequently made return to the processing at S31 to thereafter repeatedly carry out the processing from S31, S32, and S91.

Figure 10:
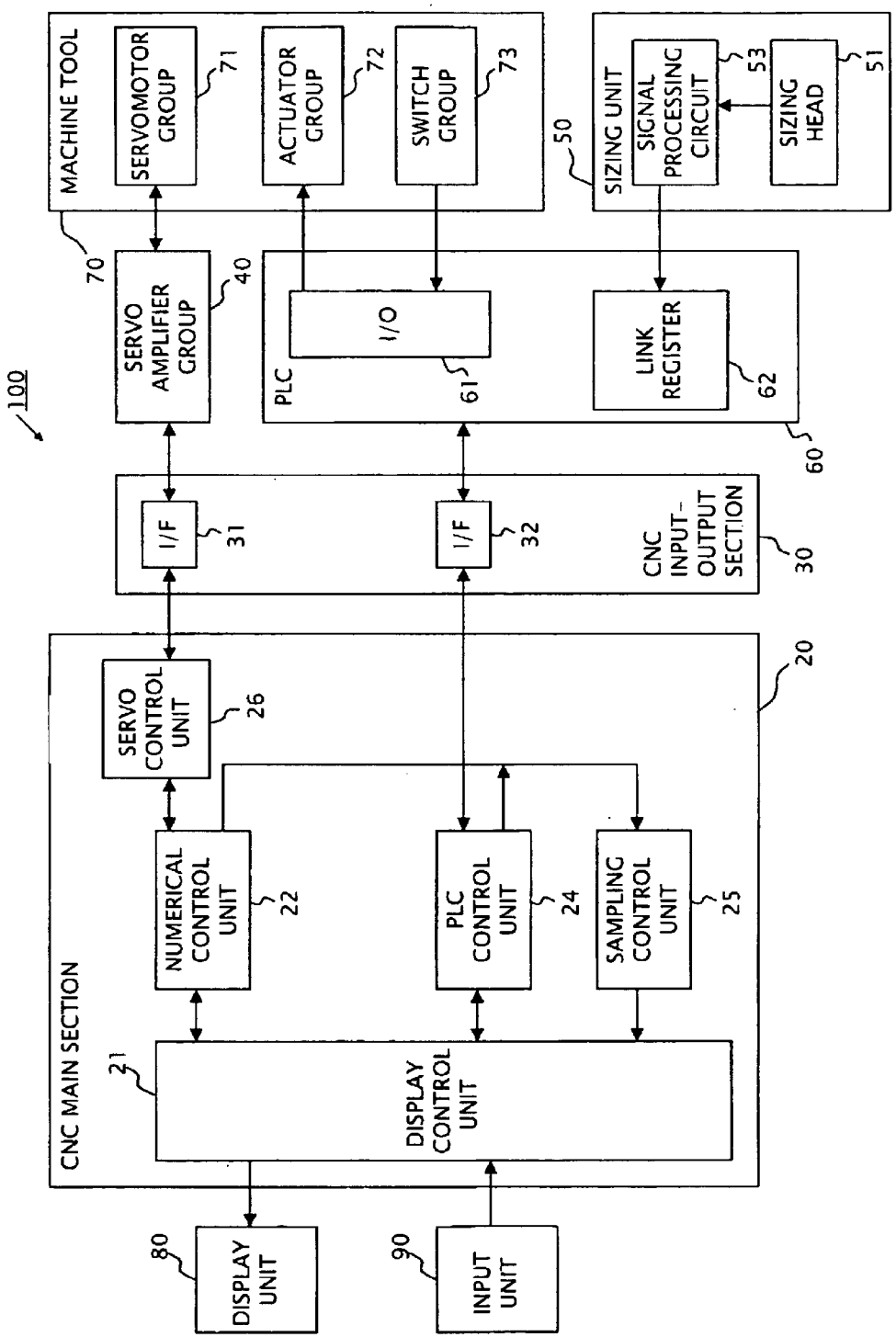
FIG. 10 is a block diagram schematically showing a principal configuration of a control system of a machine tool in another embodiment of the invention.

[5] FIG. 10 is a block circuit diagram schematically showing a principal configuration of a control system 100 of the machine tool 70 in another embodiment.

In the control system 100 shown in FIG. 10, the difference from the control system 10 shown in FIG. 1 is in the following in which the same components as those in the control system 10 are denoted by the same reference numerals with detailed descriptions thereof omitted.

(1) The sizing control unit 23 is omitted from the functional blocks in the CNC main section 20.

(2) The sizing unit A/D converter 33 is omitted from the CNC input-output section 30.

(3) The PLC 60 is formed by including a well-known microcomputer having a link register 62 in addition to the CPU, the RAM, the ROM (each not shown), and the input-output (I/O) register 61.

(4) The sizing unit 50 is formed of the sizing head 51 and a signal processing circuit 53. The signal processing circuit 53 carries out processing like the sizing control processing shown in FIG. 5 based on the detection signal outputted from the sizing head 51, producing sizing control data as a result of judgement of the sizing control processing to output the sizing control data to the link register 62 in the PLC 60.

(5) The PLC 60 transfers the sizing control data inputted to the link register 62 to the PLC control unit 24 in the PLC main section 20 through the PLC interface 32 in the CNC input-output section 32. The PLC control unit 24 further transfers the transferred sizing control data to the sampling control unit 25. The sampling control unit 25 stores the sizing control data in the processing at S65 shown in FIG. 6.

That is, in the control system 100, the functions of the sizing control unit 23 and the sizing unit A/D converter 33 in the control system 10 are included in the signal processing circuit 53. In this way, there can be also obtained the same working-effect as that obtained by the control system 10.

While the present invention has been particularly shown and described with reference to preferred embodiments thereof, it will be understood by those skilled in the art that the foregoing and other changes in form and details can be made therein without departing from the spirit and scope of the present invention.

Obviously, numerous modifications and variations of the present invention are possible in light of the above teachings. It is thereby to be understood that within the scope of the appended claims, the present invention may be practiced otherwise than as specifically described herein.

What is claimed is:

1. A control system of a machine tool comprising:

a machine tool having a plurality of control axes for carrying out machining of a workpiece;

a computerized numerical controller carrying out numerical control of each of a plurality of the control axes of the machine tool according to an operation program;

a programmable logic controller carrying out control of the machine tool according to the operation program;

a measuring unit measuring states of the workpiece under machining by the machine tool; and a display unit displaying details of control by the computerized numerical controller, details of control by the programmable logic controller, and details of measurement by the measuring unit.

2. The control system of a machine tool as claimed in claim 1 further comprising sampling and displaying means for simultaneously sampling the details from each of the computerized numerical controller, the programmable logic controller, and the measuring unit with a timing based on the operation program of the computerized numerical controller, and making the display unit display the sampled details.

3. The control system of a machine tool as claimed in claim 1 further comprising sampling and displaying means for simultaneously sampling the details from each of the computerized numerical controller, the programmable logic controller, and the measuring unit with a timing based on a state of operation of the machine tool, and making the display unit display the sampled details.

4. The control system of a machine tool as claimed in claim 3 wherein the programmable logic controller has detecting means for detecting the state of operation of the machine tool and makes a judgment about the state of operation of the machine tool on the basis of the result of the detection of the detecting means, and the sampling and displaying means makes setting of the timing for sampling the details from each of the computerized numerical controller, the programmable logic controller, and the measuring unit on the basis of the state of operation of the machine tool judged by the programmable logic controller.

5. The control system of a machine tool as claimed in any one of claim 1 or 2 to 4 further comprising an input unit for selecting and indicating the details to be displayed on the display unit.

6. A control system of a machine tool comprising:

a machine tool having a plurality of control axes for carrying out machining of a workpiece;

a computerized numerical controller adapted to carry out numerical control of each of a plurality of the control axes of the machine tool according to an operation program;

a programmable logic controller adapted to carry out control of the machine tool according to the operation program;

a measuring unit adapted to measure states of the workpiece under machining by the machine tool; and a display unit operatively connected to the computerized numerical controller, the programmable logic controller and the measuring unit so as to display details of control by the computerized numerical controller, details of control by the programmable logic controller, and details of measurement by the measuring unit.

* * * * *